No. 807,638. PATENTED DEC. 19, 1905.
D. PLATTNER.
HAY STACKER.
APPLICATION FILED JAN. 11, 1905.

3 SHEETS—SHEET 3.

David Plattner,
Inventor.

Witnesses
by C.A.Snow & Co,
Attorneys

UNITED STATES PATENT OFFICE.

DAVID PLATTNER, OF DENVER, COLORADO, ASSIGNOR TO PLATTNER IMPLEMENT CO., OF DENVER, COLORADO.

HAY-STACKER.

No. 807,638.      Specification of Letters Patent.      Patented Dec. 19, 1905.

Application filed January 11, 1905. Serial No. 240,639.

*To all whom it may concern:*

Be it known that I, DAVID PLATTNER, a citizen of the United States, residing at Denver, in the county of Denver and State of Colorado, have invented a new and useful Hay-Stacker, of which the following is a specification.

This invention relates to hay-stackers; and the principal object of the invention is to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 1:
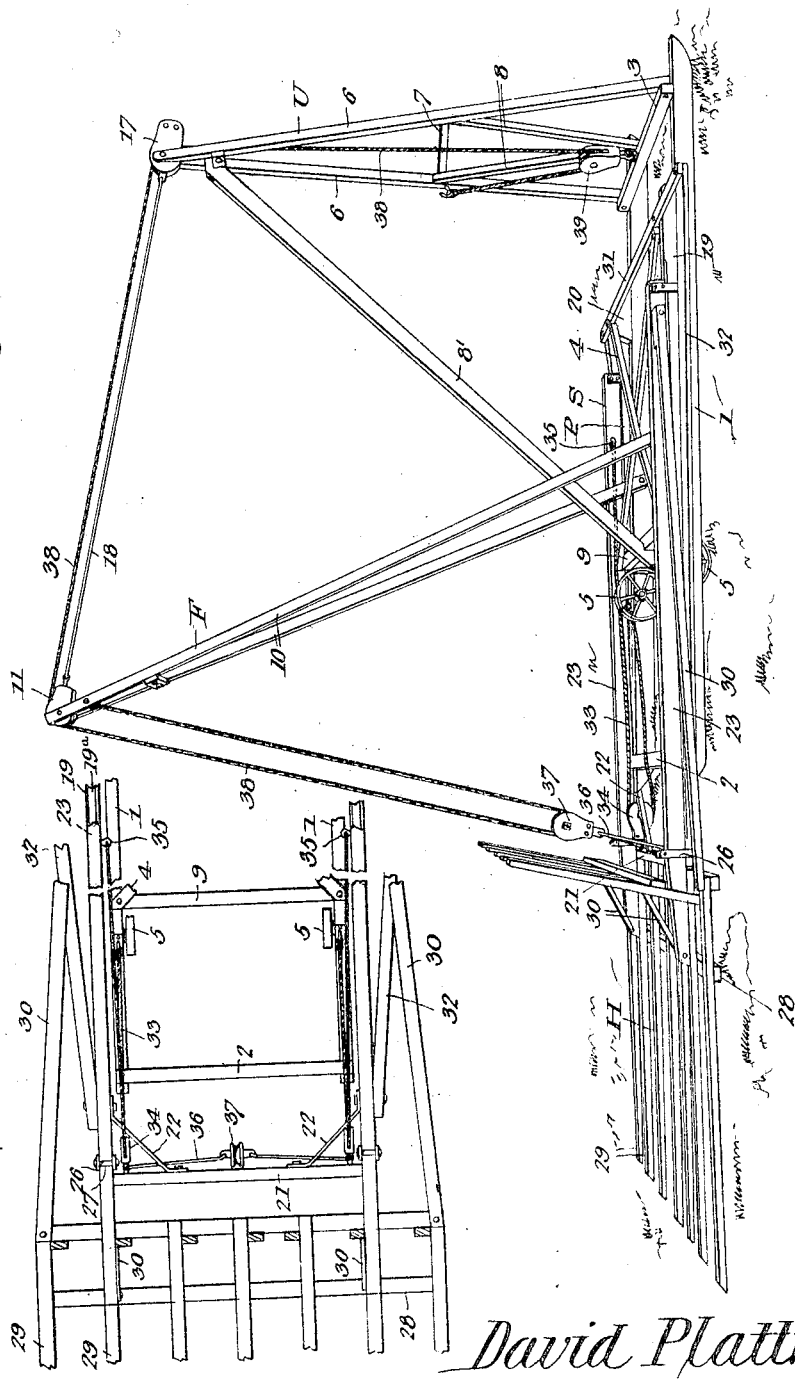
Figure 2:
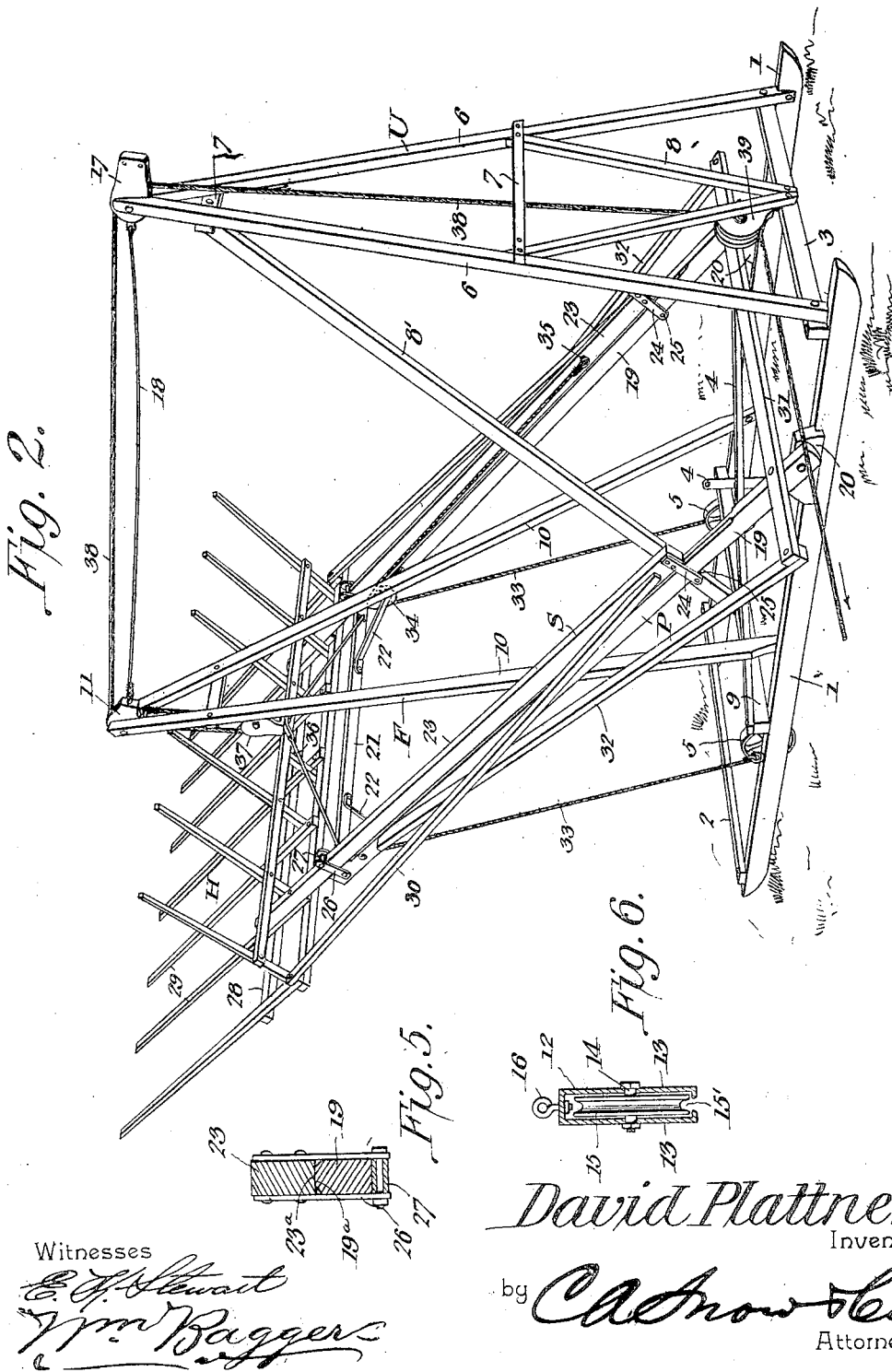
Figure 3:
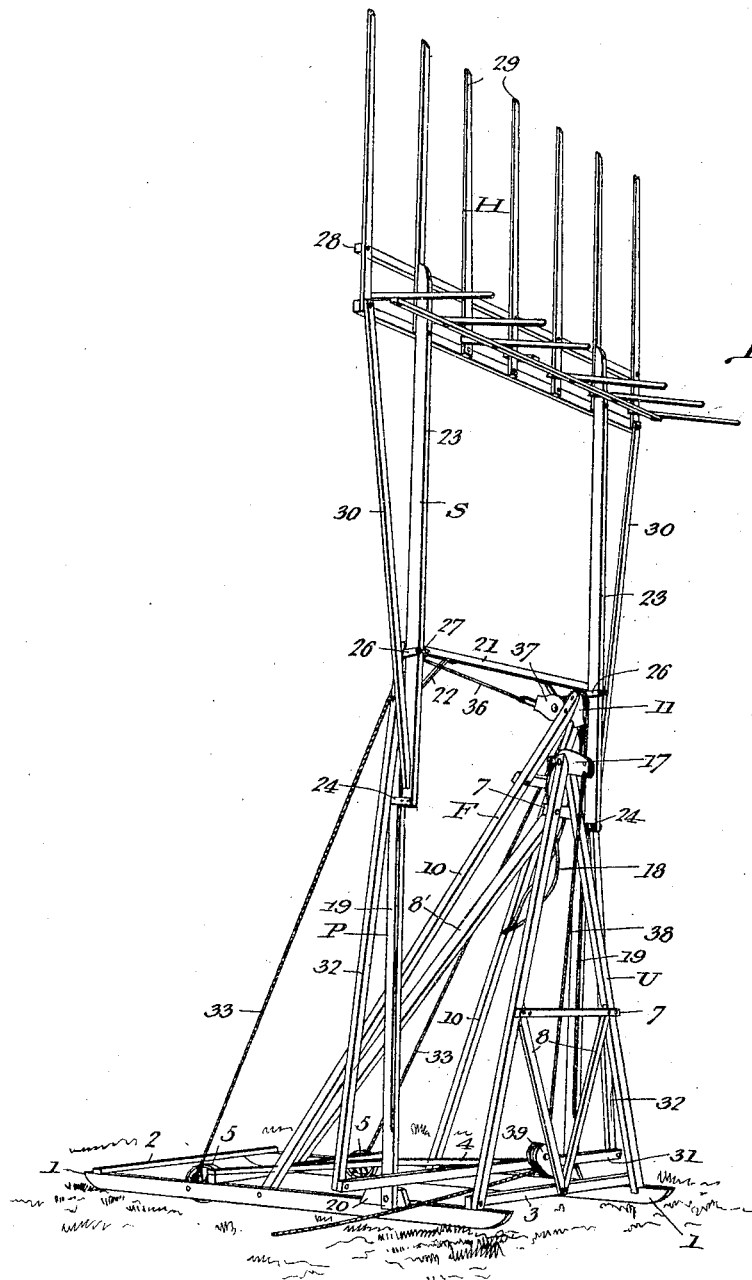

In said drawings, Figure 1 is a perspective view of a hay-stacker constructed in accordance with the principles of the invention and showing the same in load-receiving position. Fig. 2 is a perspective view showing the device with the stacker-frame partially elevated. Fig. 3 is a perspective view showing the device in load-discharging position. Fig. 4 is a detail plan view of a portion of the device in the position shown in Fig. 1. Figs. 5 and 5ª are sectional detail views taken at different points through the side members of the load-carrying frame and the sliding extension-frame. Fig. 6 is a sectional detail view showing the preferred form of pulley used in connection with this device.

Corresponding parts in the several figures are indicated by like characters of reference.

The base-frame of the machine is composed, essentially, of a pair of skids or runners 1 1, which are suitably connected by means of cross-braces 2 3 and diagonals 4 4, said skids or runners being also provided with low transporting-wheels 5 to facilitate the transportation of the machine from one place to another. Firmly connected with the runners and with the cross-piece 3, which is located near the rear ends of said runners, are the side members 6 6 of an upright frame U, which said side members converge upwardly and are suitably connected with each other and with the cross-piece 3 by means of cross-bars 7 and braces 8. The inverted-V-shaped frame U is preferably reinforced by an inclined brace 8', the lower end of which is connected with a cross-bar 9, supported upon the runners 1 1.

Pivotally connected with the runners 1 1, intermediate the front and rear ends of said runners, are the lower ends of the side members 10 of an inverted-V-shaped frame F, at the apex of which is mounted a pulley 11. A number of such pulleys are employed in the construction of the machine, and said pulleys are all of the construction specially disclosed in Fig. 6 of the drawings, by reference to which it will be seen that it includes a casing 12, having cheeks or side pieces 13, affording bearings for a pin 14, upon which a sheave 15 is mounted for rotation, said sheave having an annular groove 15', which is to be of a width and depth equal to the diameter of the cable that is to be used in connection therewith. Thus if a half-inch cable is to be used the groove 15' will be made one-half inch wide and one-half inch deep. This is for the purpose of preventing the cable from flattening while in use, as cables used in connection with this class of machines are very apt to do, this flattening process tending to prematurely wear the cables and render them unserviceable. By the pulleys of this improved construction this objection is overcome, and it is to be understood that all the pulleys used in this machine are to be of the construction just described. Another feature of the pulley-casings is that they are provided with swiveled connecting means, such as rings 16, thus enabling the pulleys to be conveniently turned in the desired direction of draft.

A pulley 17, supported at the upper end of the frame U, is connected with the pulley 11 by means of a flexible connecting member, such as a cable 18 of suitable dimensions. The pivoted frame F may thus be sustained in a forwardly-tilted position, as best seen in Fig. 1 of the drawings.

The stacker-frame of the device includes a pivoted frame P and a sliding frame S. The side members 19 of the frame P are pivotally connected with the base-frame. In the drawings the runners 1 of the base-frame have been shown as provided with brackets 20, upon which the members 19 are pivoted. The outer ends of the members 19 are connected by a cross-bar 21, which is reinforced by corner-braces 22, which coöperate with said cross-bar and side members to constitute the pivoted frame P.

The sliding frame S has side members 23 slidably engaging the side members 19 of the frame P. The members 23 have clips 24 encircling the members 19, said clips including antifriction-rollers 25, bearing against the under surfaces of said members 19. The latter are in like manner provided with clips 26, encircling the members 23 and including antifriction-rollers 27, bearing upon the upper surfaces of said members 23. The faces of the members 19, which engage the faces of the members 23, are chamfered, as will be best seen in Figs. 5 and $5^a$, where said chamfered faces are designated $19^a$, this construction being for the purpose of reducing the frictional contact-surfaces, and consequently facilitating the operation of the device. The sliding frame S includes a load-receiving head H, constructed in the usual manner of cross-bars 28, and fingers or tines 29, braces 30 being employed to connect said head with the side members 23. The pivoted frame P includes a cross-bar 31, connecting the side members 19 near the points at which said side members are pivotally connected with the base-frame. The ends of the cross-bar 31, which are extended beyond the side members 19, are connected with the latter by obliquely-disposed braces 32.

Connected with the side members or runners 1 1 of the base-frame are flexible members, such as cables 33, which are guided over guide members 34, supported upon the inner sides of the side members 19 of the pivoted frame P near the outer or free end of the latter, the ends of said cables or flexible members being made fast to the side members of the sliding frame S near the rear or inner ends of said side members at points designated 35.

Suitably connected with the pivoted frame P, near the free end of the latter, is a yoke or bail 36, carrying a pulley 37.

38 is a flexible draft member or cable, one end of which is made fast near the upper end of the upright tilting frame F, said cable being guided over the pulleys 37, 11, and 17, and downwardly from the latter and over a pulley 39, supported near the lower end of the frame U, from which the said cable passes to the point of attachment of the draft.

The initial or receiving position of the device is illustrated in Fig. 1 of the drawings, by reference to which it will be seen that the frames P and S are supported in an approximately horizontal position with the head H practically resting upon the ground, said frames P and S being in collapsed relation to one another. The load may be deposited upon the stacker-head H in the usual well-known manner, as by means of a gathering-rake. When the load has been deposited, draft is applied to the member 38, said draft being for a time exercised directly upon the pivoted frame P, which is thus swung in an upward direction upon its fulcrum, carrying with it the frame S, having the load-supporting head H. When the position approximately indicated in Fig. 2 of the drawings has been reached, it is obvious that upward draft upon the free end of the frame P can no longer take place, the pulleys 37 and 11 being in the closest possible relation. A continuance of the draft will therefore cause the frame F to tilt upon its fulcrum, the guy-rope or connecting member 18 slackening to admit of this movement. In the meantime the flexible members 33, which at the beginning of the operation were somewhat slack, as will be seen by reference to Fig. 1, have been drawn taut, and as the frame F, and with it the pivoted frame P, is tilted the said members 33 will exercise an upward draft upon the sliding frame S, thus carrying the load in an upward direction until the point illustrated in Fig. 3 has been reached, where the tilting frame F practically abuts upon the upright frame U and where the load-carrying frame S has attained its maximum elevation. It is to be especially observed that when the frames F and P pass into this position the said frames will contact with the upright frame U, thus causing the load to be effectively pitched in a rearward direction and deposited upon the stack which is being built. It will be particularly observed that this manner of discharging the load is essentially different from the operation of stackers in which the load is simply permitted to slide off from the carrying member and where as a natural consequence the load is dropped directly in rear of the stacker. By this improved device the load may be pitched quite a distance, and the result is that a larger, a more compact, and a better-appearing stack may be built without necessity of frequently shifting the position of the machine. When the draft element is slackened, the weight of the descending frame S will tend to restore the several parts of the machine to normal or initial position without necessity of using springs, weights, or other mechanical means for this purpose. By adjusting the length of the flexible members 33 the point of elevation and discharge of the load may be determined and regulated.

Attention is invited to the fact that in the operation of this device the lifting action during the first part of the operation is applied entirely to the load-carrying frame, which is composed of the pivoted frame P and the sliding frame S. The latter will remain stationary with relation to the frame P until the load has been elevated a considerable distance to the position approximately indicated in Fig. 2 of the drawings. Not until this point is reached will the sliding frame S begin to travel outward and upward with relation to the frame P; but at the point where this outward and upward movement begins the frames P and S occupy a position with relation to each other which enables the frame S to be moved along the frame P with but little frictional resistance, the draft exercised by the flexible members 33 tending in a measure to lift the frame S apart from the frame P. Thus when the load is moved upward there is little resistance to be overcome beyond the actual weight of the load. On the other hand, when the load has been discharged and the draft upon the draft-rope is slackened the frame S descends by gravity, thus causing strain in a forward direction to be exercised through the medium of the tackle upon the upper end of the frame F, which latter is thus tilted forwardly to its normal position, while the load-carrying frame gravitates to its normal position, and that without the intervention of weights, springs, or other cumbersome or complicated devices.

Having thus described the invention, what is claimed is—

1. In a stacker, an upright frame, a movable fulcrum-frame, a pivoted load-carrying frame having an extensible load-carrying member, and means for swinging the load-carrying frame against the movable fulcrum-frame and the latter against the upright frame and for elevating the extensible load-carrying member to a load-discharging position, from which the several parts are restored to normal position by the descent, by gravity, of the load-carrying member.

2. In a stacker, a relatively stationary upright, a movably-supported guide, a pivoted load-carrying frame, an extension member connected slidingly with said frame and having a load-receiving head, guides upon the side members of the pivoted frame, flexible members connected with the side members of the extension-frame and guided over the guide members upon the pivoted frame to fixed points of attachment below said frame, and means guided over the movably-supported guide for applying draft to the load-supporting frame in the direction of the movable guide and to the latter in the direction of the stationary upright.

3. A base-frame, a load-supporting frame pivotally connected therewith, guides near the free end of said frame, an extension-frame slidingly connected with the load-carrying frame, flexible elements connected with the side members of the slidable extension near their inner ends and guided over the guides upon the load-carrying frame to fixed points of attachment upon the base-frame, a movably-supported guide, draft means applied to the load-carrying frame and guided over the movably-supported guide, and a relatively stationary member having rope-guiding means; said stationary member being disposed in the path of the supporting means of the movable guide.

4. In a stacker, a base-frame, a relatively stationary upright frame, a tilting frame, guides carried by said tilting and upright frames, a pivoted load-carrying frame, a yoke connected with said frame, a guide supported by said yoke, and a draft element connected with the tilting frame and guided successively over the guides supported by the yoke of the load-carrying frame, by the tilting frame, and by the stationary frame.

In testimony that I claim the foregoing as my own I have hereto affixed my signature in the presence of two witnesses.

DAVID PLATTNER.

Witnesses:
 JOHN PLATTNER,
 M. JAY SPALDING.